United States Patent [19]

Usui et al.

[11] Patent Number: 5,054,185
[45] Date of Patent: Oct. 8, 1991

[54] METHOD OF FABRICATING DOUBLE PIPE

[75] Inventors: Masayoshi Usui; Takeshi Matsumoto, both of Numazu, Japan

[73] Assignee: Usui Kokusai Sangyo Kaisha, Ltd., Japan

[21] Appl. No.: 431,661

[22] Filed: Nov. 3, 1989

[30] Foreign Application Priority Data

Nov. 15, 1988 [JP] Japan .................. 63-288257

[51] Int. Cl.⁵ ............................................ B21D 39/00
[52] U.S. Cl. .................................. 29/455.1; 29/469.5; 29/424; 29/458; 138/148; 156/292; 181/228
[58] Field of Search ............... 29/423, 424, 455.1, 29/458, 527.1, 527.2, 469.5; 138/140, 145, 146, 148; 427/226, 228, 388.1, 239; 156/155, 292, 294; 264/317, 512, DIG. 44; 181/227, 228

[56] References Cited

U.S. PATENT DOCUMENTS

| | | | |
|---|---|---|---|
| 3,068,563 | 12/1962 | Reverman | 29/458 |
| 3,132,979 | 5/1964 | Bickerdike et al. | 156/294 X |
| 3,133,612 | 5/1964 | Sailler | 138/148 X |
| 3,209,856 | 10/1965 | Saunders | 138/148 X |
| 4,028,785 | 6/1977 | Jackson et al. | 29/458 X |

Primary Examiner—Joseph M. Gorski
Assistant Examiner—S. Thomas Hughes
Attorney, Agent, or Firm—Anthony J. Casella; Gerald E. Hespos

[57] ABSTRACT

There is disclosed a method of fabricating a double pipe capable of attenuating vibration. The pipe can be used in an automobile exhaust system. The method is initiated with forming a coating either on the outer surface of an inner pipe or on the inner surface of the outer pipe. The coating is made from an epoxy resin, an acrylic resin, or other resin. The inner pipe is inserted into the outer pipe, and then they are brought into intimate contact with each other via the coating to couple them together. The coupled pipes are heated beyond 400° C.

5 Claims, 1 Drawing Sheet

METHOD OF FABRICATING DOUBLE PIPE

BACKGROUND OF THE INVENTION

1. Field of the Invention

The present invention relates to a method of fabricating a double pipe which is used in an automotive exhaust system or the like to attenuate vibration.

2. Description of the Prior Art

Automotive exhaust pipes generate noise because of vibration of engines and pulsation of exhaust gas. Numerous efforts have been made to reduce such noise. One attempt is to use a double pipe having a quite small gap between the outer pipe and the inner pipe. The dimension of the gap is set less than the amplitudes of the outer and inner pipes. The outer and inner pipes are mechanically caused to bear against each other, for making their vibrations interfere with each other by making use of the difference in natural frequency between the outer and inner tubes. For this purpose, the gap is required to be as narrow as about 5 to 60 $\mu$m. If this gap is too large, then the outer and inner tubes do not bear against each other and so their vibrations do not interfere. At this time, the double pipe vibrates at a combined frequency. If no gap is created, the double pipe vibrates as a single pipe having a thickness equal to the sum of the thickness of the inner pipe and the thickness of the outer pipe. Hence, vibration is not effectively attenuated.

One known method of obtaining such a narrow gap is to use a die and a plug, for accurately enlarging a pipe. Another known method consists in making an adequate difference between the inside diameter of the outer pipe and the outside diameter of the inner pipe by mechanical polishing or other process and then inserting the inner pipe into the outer pipe. A further known method is to use a double pipe having an intermediate layer between the outer and inner pipes. Glass fiber is woven into the intermediate layer to absorb vibration. A still other known method consists in fabricating a double pipe and then filling the gap between the inner and outer pipes with particles of a ceramic, asbestos, or the like.

In the method of machining the inner surface of the outer pipe and the outer surface of the inner pipe separately, even if they can be machined to quite close tolerances, the gap might disappear or become too large, depending on the combination of the inner and outer pipes. For this reason, sophisticated machining techniques are needed. In order to obtain a gap of a desired size, it is necessary to combine an outer pipe and an inner pipe after they are separately measured accurately. This necessitates much labor. Where bending techniques are employed, an external force is usually applied to the outer pipe. The external force is transmitted to the inner pipe via the inner surface of the outer pipe. Therefore, the outer and inner pipes are bent in unlike manner. When the bending is complete and the double pipe is released of the external force, the outer and inner pipes spring back in unlike manner. Then, it is inevitable that the inner pipe is pressed against the inner wall of the outer pipe at every bent portion with a large force. The outer and inner pipes vibrate at the same frequency through the contacting portions. As a result, the damping effect of the double pipe weakens. Further, a double pipe having an intermediate layer for absorbing vibration requires a special manufacturing machine. In the method of filling the gap with a damping material after forming a double pipe, the gap must be made large. Therefore, the outside diameter becomes too large as compared with the inside diameter. In addition, the filling operation necessitates much labor. Furthermore, the gap between the outer and inner pipes is not uniform. In this way, the prior art manufacturing methods including bending techniques for practical usage are unable to offer double pipes capable of reducing noise satisfactorily.

SUMMARY OF THE INVENTION

It is an object of the present invention to provide a method which is used to fabricate a double pipe without presenting any one of the aforementioned problems in such a way that a uniform minute gap is left between the outer and inner pipes, whether the double pipe is straight or bent, for exhibiting excellent damping characteristics.

The above object is achieved by a method comprising the steps of forming a uniform coating on one or both of the inner surface of an outer pipe and the outer surface of an inner pipe, causing the outer and inner pipes to fit together, bringing them into intimate contact with each other, and heating them. Specifically, a coating is formed at least one of the outer surface of the inner pipe and the inner surface of the outer pipe. After the inner pipe has been inserted in the outer pipe, the outer and inner pipes are brought into intimate contact with each other via an intermediate coating layer to join them together. The resulting double pipe is heated beyond 400° C.

In one aspect of the invention, after the outer and inner pipes have been joined together, the double pipe is bent and heated beyond 450° C.

DETAILED DESCRIPTION OF THE INVENTION

The materials of coatings formed in accordance with the present invention are ordinary paints made from epoxy resins, acrylic resins, phenolic resins, fluorocarbon resins, alkyd resins, vinyl resins, and other resins.

In order to bring outer and inner pipes into intimate contact with each other after the inner pipe has been inserted in the outer pipe, the outer pipe is brought into intimate contact with the inner pipe by an extensible pipe using a die, or the diameter of the inner pipe is increased to bring the inner pipe into intimate contact with the outer pipe.

After the outer and inner pipes are brought into intimate contact with each other, they are heated beyond 400° C. If the double pipe is required to be bent, it is desired to heat the double pipe after it is bent. In this case, it is necessary to heat the pipe beyond 450° C., for completely removing residual strain.

Figure 2:
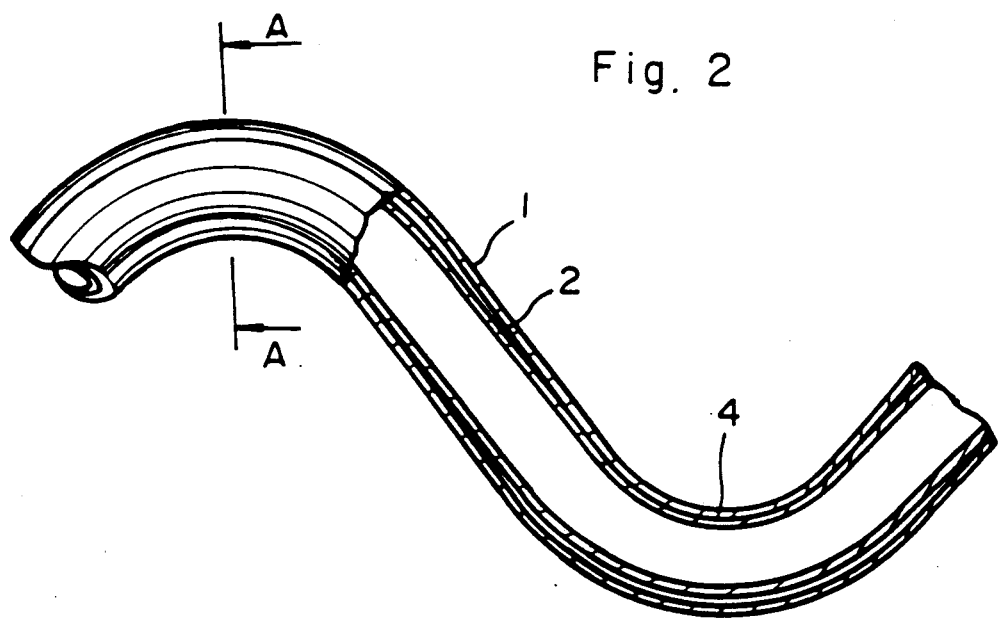
FIG. 2 is a fragmentary horizontal cross section of a bent double pipe fabricated by the prior art techniques.
Figure 3:
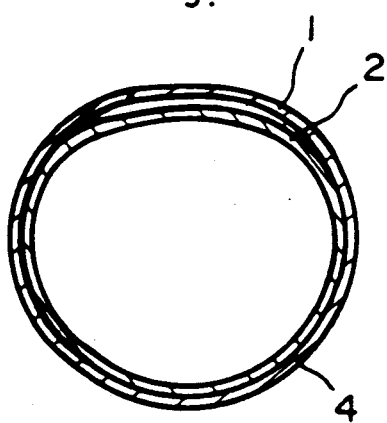
FIG. 3 is a cross-sectional view taken on line A—A of FIG. 2.
Figure 1:
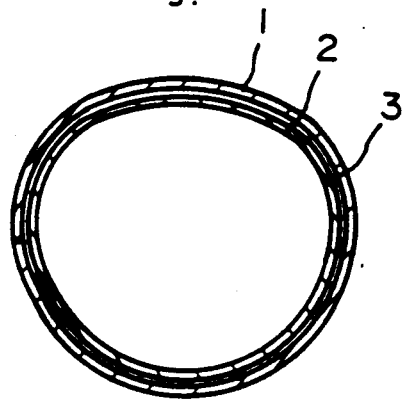
FIG. 1 is a vertical cross section of a double pipe fabricated in accordance with the invention.

In accordance with the present invention, a coating is formed at least one of the inner surface of the outer pipe and the outer surface of the inner pipe to maintain the space between the inner surface of the outer pipe and the outer surface of the inner pipe. This makes it easy to render the gap uniform. Further, any desired space can be obtained by appropriately selecting the thickness of the coating. The formed coating is baked in the gap by heating. Residues consisting principally of carbon are left in the gap between the pipes. Since almost all the volatile component is released, the volume of the coating decreases, making the coating porous. Hence, the density of the residues is low. Because the gap is not densely packed with the residues, vibrations of the outer and inner pipes are attenuated. Where the double pipe is bent, the outer and inner pipes are not pressed against each other with a large force, unlike double pipes shown in FIGS. 2 and 3, in each of which an outer pipe 1 is pressed against an inner pipe 2 at a contacting portion 4 with a large force. As shown in FIG. 1, in the novel double pipe, a uniform gap 3 can be maintained. Before the double pipe is heated, it is bent. Where it is heated beyond 450° C., the residual stress created by bending disappears, and neither the outer pipe nor the inner pipe springs back. Hence, the gap can be better maintained uniform.

EXAMPLES

The results of experiments made on double pipes fabricated in accordance with the invention are given below. Steel pipes having an outside diameter of 19 mm and a thickness of 1.2 mm were used as inner pipes. Steel pipes having an outside diameter of 22 mm and a thickness of 1.0 mm were employed as outer pipes. A coating was formed on the outer surface of each steel pipe acting as an inner pipe. Then, the steel pipes serving as inner pipes were inserted into the steel pipes acting as outer pipes. Thereafter, the diameters of the outer pipes were reduced, using a die having a diameter of 21 mm. Thus, double pipes were fabricated. Some of the double pipes were kept straight. The other double pipes were each bent through an angle of 90° at a radius of curvature of 60 mm at three locations. Then, they were put into a furnace the inside of which was a neutral atmosphere. Inside this furnace, they were heated for 30 minutes at various temperatures. Thereafter, they are cooled in the atmosphere. In this way, straight double pipes and pipes having finished shapes were completed. The cross sections of the straight portions and the bent portions of the double pipes were examined to know whether a uniform minute gap was secured between the outer and inner pipes of each double pipe. The results are indicated in Table 1.

TABLE 1

| | | Acceptability of double tubes treated at various temperatures. | | | | | |
|---|---|---|---|---|---|---|---|
| Coating | Shape | 350° C. | 400° C. | 450° C. | 500° C. | 800° C. | 1000° C. |
| E:20 μm | straight | X | ○ | ○ | ○ | ○ | ○ |
| E:20 μm | bent | X | Δ | ○ | ○ | ○ | ○ |
| V:45 μm | straight | ○ | ○ | ○ | ○ | ○ | ○ |
| V:45 μm | bent | Δ | Δ | ○ | ○ | ○ | ○ |
| F:15 μm | straight | X | ○ | ○ | ○ | ○ | ○ |
| F:15 μm | bent | X | Δ | ○ | ○ | ○ | ○ |

In this table, coating E is made from an epoxy resin. Coating V is made from a vinyl resin. Coating F is made from a fluorocarbon resin. The numerical values indicate the thicknesses of the coatings. "Straight" of the "shape" column indicates that the double pipe is straight. "Bent" of the "shape" column indicates that the double pipe is bent. ○ indicates that a uniform space is maintained over the whole length and that residues left after heating the coating loosely occupy the gap. X indicates a coating which was not completely baked but still strongly couples together the outer and inner pipes. Δ indicates a coating which was baked to give rise to residues from which volatile components were released; the gap is nonuniform in the bent portion, and the inner pipe is pressed against one side of the inner surface of the outer pipe with a large force.

As can be seen from Table 1, when the coatings were heated at 350° C., none of them produced satisfactory results. At the temperature of 400° C., the straight pipes yielded good results, but, for the bent pipes, the uniformity of the space which was formed before the heating between the outer pipe and the inner pipe and contained a coating was impaired. The inner pipe was pressed against one side of the inner surface of the outer pipe with a large force. This can be explained as follows. The coating changed into residues by heating, but the residual stress created by bending could not be fully removed at this temperature. A change in the thickness of the coating caused the pipe to spring back, whereby the pipe deformed. For the coatings heated at 450° C., the coatings changed into residues at every location and loosely occupied the gaps. The space between the outer and inner pipes were kept uniform.

In accordance with the present invention, a coating is formed on at least one of the inner surface of an outer pipe and the outer surface of an inner pipe. The outer pipe is inserted into the inner pipe. The inner surface of the outer pipe is brought into intimate contact with the outer surface of the inner pipe. Then, they are heated. Therefore, a double pipe can be easily fabricated in which the space between the outer and inner pipes is maintained uniform over the whole length. Residues which are left after heating the coating exist uniformly in the gap. However the heating releases volatile components of the coating, thereby leaving a porous residue in the uniform gap between the inner and outer pipes. The outer and inner pipes of the double pipe are connected together via the residues. When the double pipe vibrates, the outer and inner pipes vibrate at different frequencies and so they interfere with each other, attenuating the vibration. Hence, vibration and noise can be reduced considerably.

What is claimed is:

1. A method of fabricating a double pipe, comprising the steps of:
    providing an inner pipe with an outer surface and an outer pipe with an inner surface, said inner pipe being dimensioned to be fit within the outer pipe;
    forming a coating on at least one of the outer surface of the inner pipe and the inner surface of the outer pipe, the coating comprising a material selected from the group consisting of epoxy resins, acrylic resins, phenolic resins, fluorocarbon resins, alkyd resins and vinyl resins;
    inserting the inner pipe into the outer pipe and dimensionally changing at least a selected one of the pipes by dimensionally changing both inside and outside radii of the selected pipe such that the coating is in intimate contact with each of said pipes, thereby coupling together the inner and outer pipes; and
    heating the coupled pipes beyond 400° C., whereby the heating burns off a substantial portion of the coating and leaves a substantially uniform porous residue comprised primarily of carbon connecting the inner and outer pipes.

2. A method of fabricating a double pipe, comprising the steps of:

providing an inner pipe with an outer surface and an outer pipe with an inner surface, said inner pipe being dimensioned to be fit within the outer pipe;

forming a coating on at least one of the outer surface of the inner pipe and the inner surface of the outer pipe, the coating comprising a material selected from the group consisting of epoxy resins, acrylic resins, phenolic resins, fluorocarbon resins, alkyd resins and vinyl resins;

inserting the inner pipe into the outer pipe and dimensionally changing at least one of the pipes such that the coating is in intimate contact with each of said pipes to couple together the inner and outer pipes;

bending the coupled pipes; and heating the coupled pipes beyond 450° C., whereby the heating burns off a substantial portion of the coating and leaves a substantially uniform porous residue comprised primarily of carbon connecting the inner and outer pipes.

3. A method of fabricating a double pipe, comprising the steps of:

providing a steel inner pipe with an outer surface and a steel outer pipe with an inner surface, said inner pipe being dimensioned to be fit within the outer pipe;

forming a coating on at least one of the outer surface of the inner pipe and the inner surface of the outer pipe, the coating comprising a material selected from the group consisting of epoxy resins, acrylic resins, phenolic resins, fluorocarbon resins, alkyd resins and vinyl resins;

inserting the inner pipe into the outer pipe and dimensionally changing at least one of the pipes such that the coating is in intimate contact with each of said pipes, thereby coupling together the inner and outer pipes; and heating coupled pipes beyond 400° C., whereby the heating burns off a substantial portion of the coating and leaves a substantially uniform porous residue comprised primarily of carbon connecting the steel inner and outer pipes.

4. A method of fabricating a double pipe, comprising the steps of:

providing an inner pipe with an outer surface and an outer pipe with an inner surface, said inner pipe being dimensioned to be fit within the outer pipe;

forming a coating on at least one of the outer surface of the inner pipe and the inner surface of the outer pipe, the coating comprising a material selected from the group consisting of epoxy resins, acrylic resins, phenolic resins, fluorocarbon resins, alkyd resins and vinyl resins;

inserting the inner pipe into the outer pipe and dimensionally changing at least one of the pipes by using an extensible pipe employing a die such that the coating is in intimate contact with each of said pipes, thereby coupling together the inner and outer pipes; and heating the coupled pipes beyond 400° C., whereby the heating burns off a substantial portion of the coating and leaves a substantially uniform porous residue comprised primarily of carbon connecting the inner and outer pipes.

5. A method of fabricating a double pipe, comprising the steps of:

providing an inner pipe with an outer surface and an outer pipe with an inner surface, said inner pipe being dimensioned to be fit within the outer pipe;

forming a coating on at least one of the outer surface of the inner pipe and the inner surface of the outer pipe, the coating comprising a material selected from the group consisting of epoxy resins, acrylic resins, phenolic resins, fluorocarbon resins, alkyd resins and vinyl resins;

inserting the inner pipe into the outer pipe and dimensionally changing at least one of the pipes by enlarging the inner pipe toward the outer pipe such that the coating is in intimate contact with each of said pipes, thereby coupling together the inner and outer pipes; and heating the coupled pipes beyond 400° C., whereby the heating burns off a substantial portion of the coating and leaves a substantially uniform porous residue comprised primarily of carbon connecting the inner and outer pipes.

* * * * *